(12) United States Patent
Sato

(10) Patent No.: US 12,441,477 B2
(45) Date of Patent: Oct. 14, 2025

(54) AIRCRAFT CONTROL SYSTEM, AIRCRAFT CONTROL METHOD, AND STORAGE MEDIUM

(71) Applicant: HONDA MOTOR CO., LTD., Tokyo (JP)

(72) Inventor: Daisuke Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 349 days.

(21) Appl. No.: 18/100,578

(22) Filed: Jan. 24, 2023

(65) Prior Publication Data

US 2023/0234717 A1  Jul. 27, 2023

(30) Foreign Application Priority Data

Jan. 27, 2022  (JP) ................. 2022-010660

(51) Int. Cl.
*B64D 31/00* (2024.01)
*B64D 27/24* (2024.01)
(Continued)

(52) U.S. Cl.
CPC ............ *B64D 31/06* (2013.01); *B64D 27/33* (2024.01); *B64D 31/18* (2024.01); *B64D 33/06* (2013.01);
(Continued)

(58) Field of Classification Search
CPC ........ B64D 31/00; B64D 27/24; B64D 33/06; B64D 35/00; G05D 13/62; G05D 17/02
(Continued)

(56) References Cited

U.S. PATENT DOCUMENTS 8,727,271 B2 * 5/2014 Salyer .................. B64D 27/357
244/17.11
9,169,027 B2 * 10/2015 Strauss .................. B64D 35/00
(Continued)

FOREIGN PATENT DOCUMENTS

CA   2628440 C  *  7/2014  ............. F01D 15/10
CA   3008009 A1 *  6/2017  ............. H02J 3/241
(Continued)

OTHER PUBLICATIONS

C. J. Spain et al., "Reduction of airplane noise and vibration," 1936, vol. 15, Publisher: Nokia Bell Labs.*
(Continued)

*Primary Examiner* — Tuan C To
(74) *Attorney, Agent, or Firm* — Amin, Turocy & Watson, LLP

(57) ABSTRACT

An aircraft control system includes: a first engine attached to an airframe of an aircraft; a second engine attached to the airframe; a first power generator connected to an engine shaft of the first engine; a second power generator connected to an engine shaft of the second engine; an electric motor driven with electric power supplied from one or both of the
(Continued)

first power generator and the second power generator; a rotor driven with a driving force output from the electric motor; and a controller configured to estimate whether noise excess conditions have been satisfied on the basis of information for estimating noise and to change one or both of a rotation speed and a magnitude of a torque such that noise is lower than that before the noise excess conditions have been satisfied when it is estimated that the noise excess conditions have been satisfied.

10 Claims, 7 Drawing Sheets

(51) Int. Cl.
| | |
|---|---|
| *B64D 27/33* | (2024.01) |
| *B64D 31/06* | (2006.01) |
| *B64D 31/18* | (2024.01) |
| *B64D 33/04* | (2006.01) |
| *B64D 35/00* | (2006.01) |
| *F02K 1/34* | (2006.01) |
| *G05D 13/62* | (2006.01) |
| *G05D 17/02* | (2006.01) |

(52) U.S. Cl.
CPC ............. *B64D 35/00* (2013.01); *G05D 13/62* (2013.01); *G05D 17/02* (2013.01)

(58) Field of Classification Search
USPC .............................................. 701/3
See application file for complete search history.

(56) References Cited

U.S. PATENT DOCUMENTS

| | | | | |
|---|---|---|---|---|
| 9,193,451 | B2* | 11/2015 | Salyer | B64D 27/33 |
| 10,377,500 | B2* | 8/2019 | Kobayashi | B64D 31/18 |
| 2018/0327081 | A1* | 11/2018 | Gartenberg | B64C 11/06 |
| 2020/0309045 | A1* | 10/2020 | Gomez | B64D 35/08 |
| 2021/0047047 | A1* | 2/2021 | Ribeiro | B64D 27/24 |
| 2021/0301732 | A1* | 9/2021 | Tomescu | F02C 9/00 |
| 2023/0036722 | A1 | 2/2023 | Hanamitsu | |

FOREIGN PATENT DOCUMENTS

| | | |
|---|---|---|
| JP | 04-358725 | 12/1992 |
| WO | 2021/210065 | 10/2021 |

OTHER PUBLICATIONS

Japanese Notice Of Allowance for Japanese Patent Application No. 2022-010660 mailed Jul. 22, 2025.

* cited by examiner

AIRCRAFT CONTROL SYSTEM, AIRCRAFT CONTROL METHOD, AND STORAGE MEDIUM

CROSS-REFERENCE TO RELATED APPLICATION

Priority is claimed on Japanese Patent Application No. 2022-010660, filed Jan. 27, 2022, the content of which is incorporated herein by reference.

BACKGROUND

Field of the Invention

The present invention relates to an aircraft control system, an aircraft control method, and a storage medium.

Description of Related Art

In the related art, it is disclosed that noise is reduced by switching at least one of a plurality of gas turbine generators to an idling operation state (Japanese Unexamined Patent Application, First Publication No. H4-358725)

SUMMARY

However, in the related art, noise may not be able to be reduced in some situations. For example, in the technique disclosed in Japanese Unexamined Patent Application, First Publication No. H4-358725, since an output of an engine decreases much in the idling operation state, it may not be possible to cope with a case in which the required electric power is high.

The present invention was made in consideration of the aforementioned circumstances and an objective thereof is to provide an aircraft control system, an aircraft control method, and a storage medium that can appropriately reduce noise. Specifically, an objective of the present invention is, for example, to provide an aircraft control system, an aircraft control method, and a storage medium that can more appropriately reduce noise without decreasing an engine output much.

An aircraft control system, an aircraft control method, and a storage medium according to the present invention employ the following configurations.

(1) According to an aspect of the present invention, there is provided an aircraft control system including: a first engine that is attached to an airframe of an aircraft; a second engine that is attached to the airframe of an aircraft; a first power generator that is connected to an engine shaft of the first engine; a second power generator that is connected to an engine shaft of the second engine; an electric motor that is driven with electric power supplied from one or both of the first power generator and the second power generator; a rotor that is driven with a driving force output from the electric motor; and a controller configured to estimate whether noise excess conditions have been satisfied on the basis of information for estimating noise of the first engine and to change one or both of a rotation speed of the first engine and a magnitude of a torque of the first engine such that noise is lower than that before the noise excess conditions have been satisfied when it is estimated that the noise excess conditions have been satisfied.

(2) In the aspect of (1), the controller may be configured to control one or both of the rotation speed of the first engine and the magnitude of the torque of the first engine such that a magnitude of noise of the first engine is lower than a noise reference on the basis of a relationship between the rotation speed of the first engine and the magnitude of the torque of the first engine and the magnitude of noise of the first engine when the noise excess conditions have been satisfied.

(3) In the aspect of (2), the controller may be configured to control one or both of the rotation speed of the first engine and the magnitude of the torque of the first engine such that a fuel efficiency of the first engine is lower than a fuel efficiency reference additionally on the basis of a relationship between the rotation speed of the first engine and the magnitude of the torque of the first engine and the fuel efficiency of the first engine.

(4) In the aspect of (3), the controller may be configured to control one or both of the rotation speed of the first engine and the magnitude of the torque of the first engine with reference to a first operation map indicating the fuel efficiency distribution corresponding to the rotation speed of the first engine and the magnitude of the torque of the first engine and a second operation map indicating a noise distribution corresponding to the rotation speed of the first engine and the magnitude of the torque of the first engine.

(5) In the aspect of (3) or (4), the controller may be configured to control the first engine along an operation line which is a combination of the rotation speed of the first engine and the magnitude of the torque of the first engine and in which the fuel efficiency is optimal and to control the first engine along the operation line when it is estimated that the noise excess conditions have not been satisfied, and wherein the controller is configured to control the first engine along the operation line and to control the first engine at an operation point which is a combination of the rotation speed of the first engine and the magnitude of the torque of the first engine and at which the fuel efficiency departs from the operation line when it is estimated that the noise excess conditions have been satisfied.

(6) In the aspect of (5), the operation point may be a point at which the magnitude of noise of the first engine is lower than the noise reference, the fuel efficiency is lower than the fuel efficiency reference, and a first output of the first engine controlled on the basis of the operation point satisfies an output reference, and wherein the output reference is a reference in which the first output is within a preset range from the output of the first engine controlled on the basis of the operation line.

(7) In the aspect of one of (1) to (6), the controller may be configured to control one or both of the rotation speed of the first engine and the magnitude of the torque of the first engine to reduce the noise and to increase an output of another engine or the second engine to replenish a decreased output when a post-control output is lower by a predetermined extent than a pre-control output.

(8) In the aspect of one of (1) to (7), the aircraft control system may further comprising a storage battery that stores electric power generated by the first power generator and the second power generator, wherein the electric motor is driven using electric power output from the storage battery.

(9) According to another aspect of the present invention, there is provided an aircraft control method that is performed by a control device for an aircraft, which includes: a first engine that is attached to an airframe of an aircraft, a second engine that is attached to the airframe of an aircraft, a first power generator that is connected to an engine shaft of the first engine, a second power generator that is connected to an engine shaft of the second engine, an electric motor that is driven with electric power supplied from one or both of the first power generator and the second power generator, and a rotor that is driven with a driving force output from the electric motor, the aircraft control method comprising: estimating whether noise excess conditions have been satisfied on the basis of information for estimating noise of the first engine; and changing one or both of a rotation speed of the first engine and a magnitude of a torque of the first engine such that noise is lower than that before the noise excess conditions have been satisfied when it is estimated that the noise excess conditions have been satisfied.

(10) According to another aspect of the present invention, there is provided a storage medium for an air craft, which includes, a first engine that is attached to an airframe of an aircraft, a second engine that is attached to the airframe of an aircraft, a first power generator that is connected to an engine shaft of the first engine, a second power generator that is connected to an engine shaft of the second engine, an electric motor that is driven with electric power supplied from one or both of the first power generator and the second power generator, and a rotor that is driven with a driving force output from the electric motor; wherein the storage medium that stores a computer program to be executed by a computer to perform at least: a process of estimating whether noise excess conditions have been satisfied on the basis of information for estimating noise of first engines; and a process of changing one or both of a rotation speed of the first engine and a magnitude of a torque such of the first engine that noise is lower than that before the noise excess conditions have been satisfied when it is estimated that the noise excess conditions have been satisfied.

According to the aspects of (1) to (10), since the aircraft control system changes the rotation speed of the GT 60 and the magnitude of the torque such that noise is lower than that before the noise excess conditions have been satisfied when it is estimated that the noise excess conditions have been satisfied, it is possible to more appropriately reduce noise.

According to the aspect of (3), since the aircraft control system controls one or both of the rotation speed of the first engine and the magnitude of the torque of the first engine such that the fuel efficiency is lower than the fuel efficiency reference, it is possible to curb an influence on the fuel efficiency when the noise has been reduced.

According to the aspect of (6), since the aircraft control system further controls the first engine such that the output of the engine is within a preset range, it is possible to curb an influence on the output of the engine when noise has been reduced.

According to the aspect of (7), since the aircraft control system increases the output of another engine or the second engine to replenish the decreased output when the output of the engine has been lowered through the control for reducing noise, it is possible to curb an influence on electric power required for the aircraft as a whole when noise has been reduced.

According to the aspect of (8), since electric power generated by the power generator through operation of the first engine and the second engine is stored in the storage battery and the aircraft is propelled using electric power of the storage battery, it is possible to control the first engine such that noise is lower than that before the noise excess conditions have been satisfied and to realize control of an aircraft with reduced noise.

DETAILED DESCRIPTION

Hereinafter, an aircraft control system, an aircraft control method, and a storage medium according to an embodiment of the present invention will be described with reference to the accompanying drawings.

Figure 1:
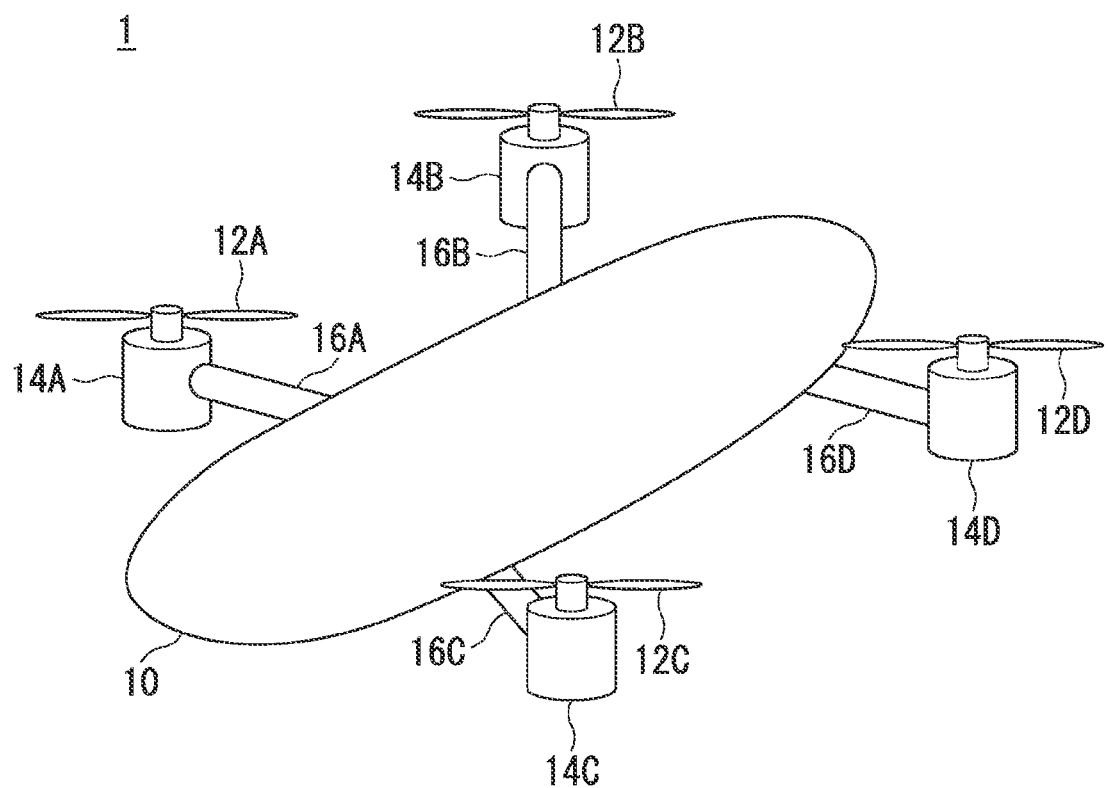
FIG. 1 is a diagram schematically illustrating a flying object in which an aircraft control system is mounted.

FIG. 1 is a diagram schematically illustrating a flying object 1 in which an aircraft control system is mounted. The flying object 1 includes, for example, an airframe 10, a plurality of rotors 12A to 12D, a plurality of electric motors 14A to 14D, and arms 16A to 16D. In the following description, the plurality of rotors 12A to 12D are referred to as rotors 12 when they are not distinguished, and the plurality of electric motors 14A to 14D are referred to as electric motors 14 when they are not distinguished. The flying object 1 may be a manned flying object or may be an unmanned flying object. The flying object 1 is not limited to a multicopter illustrated in the drawing, and may be a helicopter or a compound flying object including both a rotary wing and a fixed wing. The rotor 12A is attached to the airframe 10 via the arm 16A. The electric motor 14A is attached to a base (a rotation shaft) of the rotor 12A. The electric motor 14A drives the rotor 12A. The electric motor 14A is, for example, a brushless DC motor. The rotor 12A is a fixed wing with blades rotating around an axis parallel to the gravitational direction when the flying object 1 takes a horizontal posture. The rotors 12B to 12D, the arms 16B to 16D, and the electric motors 14B to 14D have the same functional configuration as described above and thus a description thereof will be omitted.

When the rotors 12 rotates in accordance with a control signal, the flying object 1 flies in a desired flight state. The control signal is a signal for controlling the flying object 1 based on an operator's operation or an instruction in autonomous driving. For example, when the rotor 12A and the rotor 12D rotate in a first direction (for example, a clockwise direction) and the rotor 12B and the rotor 12C rotate in a second direction (for example, a counterclockwise direction), the flying object 1 flies. An auxiliary rotor for posture stability or horizontal propulsion or the like which is not illustrated may be provided in addition to the rotors 12.

Figure 2:
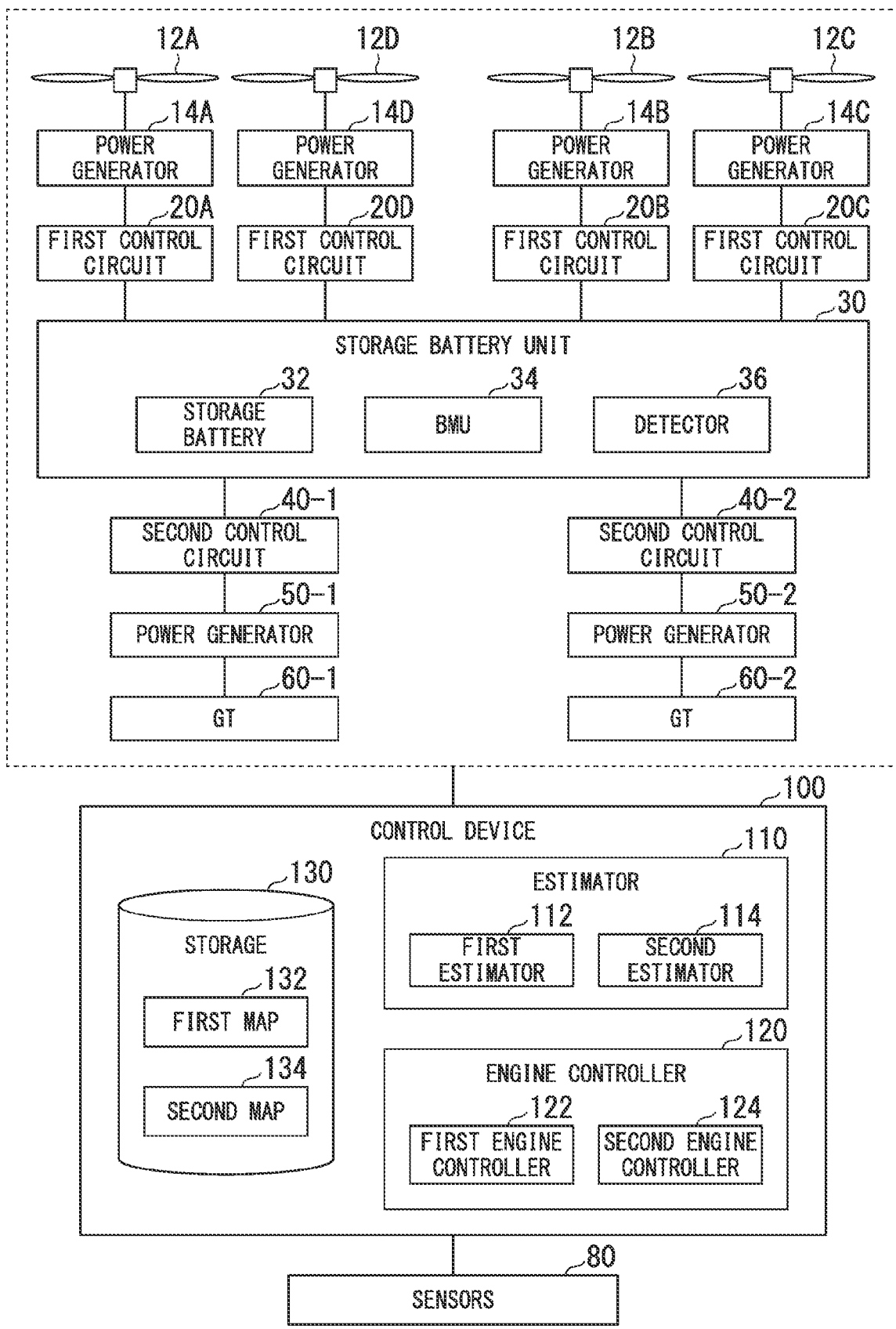
FIG. 2 is a diagram illustrating an example of a functional configuration of the flying object.

FIG. 2 is a diagram illustrating an example of a functional configuration of the flying object 1. The flying object 1 includes, for example, first control circuits 20A, 20B, 20C, and 20D, a storage battery unit 30, second control circuits 40-1 and 40-2, power generators 50-1 and 50-2, gas turbine engines (hereinafter referred to as "GTs") 60-1 and 60-2, various sensors 80, and a control device 100 in addition to the elements illustrated in FIG. 1. Elements with "1" at the end after the reference signs and hyphens are first elements corresponding to the rotor 12A, the rotor 12D, the electric motor 14A, the electric motor 14D, the first control circuit 20A, and the first control circuit 20D, and elements with "2"

added to tails of reference signs and hyphens are second elements corresponding to the rotor 12B, the rotor 12C, the electric motor 14B, the electric motor 14C, the first control circuit 20B, and the first control circuit 20C. In the following description, the first elements will be representatively described, and the second elements have the same configurations as the first elements and thus a description thereof will be omitted.

The first control circuit 20A is a power drive unit (PDU) including a drive circuit such as an inverter. The first control circuit 20A supplies electric power obtained by converting electric power supplied from the storage battery unit 30 by switching or the like to the electric motor 14A. The first control circuit 20D is the same PDU as the first control circuit 20A and supplies electric power supplied from the storage battery unit 30 to the electric motor 14D. The electric motor 14A drives the rotor 12A, and the electric motor 14D drives the rotor 12D.

The storage battery unit 30 includes, for example, a storage battery 32, a battery management unit (BMU) 34, and a detector 36. The storage battery 32 is, for example, a battery pack in which a plurality of battery cells are connected in series, in parallel, or in series and parallel. A battery cell of the storage battery 32 is, for example, a secondary battery which can be repeatedly charged and discharged such as a lithium-ion battery (LIB) or a nickel-hydride battery.

The BMU 34 performs cell balancing, detection of an abnormality in the storage battery 32, derivation of a cell temperature in the storage battery 32, derivation of a charging/discharging current in the storage battery 32, and estimation of an SOC in the storage battery 32, and the like. The BMU 34 acquires a state of the storage battery 32 on the basis of detection results from the detector 36 as described above. The detector 36 includes a voltage sensor, a current sensor, and a temperature sensor for measuring a state of charge of the storage battery 32. The detector 36 outputs the measurement results such as the measured voltage, current, and temperature to the BMU 34.

The flying object 1 may include a plurality of storage battery units 30. For example, the storage battery units 30 corresponding to the first elements and the second elements may be provided. In this embodiment, electric power generated by the power generators 50 is supplied to the storage battery 32, but may be supplied to the first control circuits 20 and the electric motors 14 without passing through the storage battery 32 (or via the storage battery 32 or selectively).

The second control circuit 40-1 is a power conditioning unit (PCU) including a converter. The second control circuit 40-1 converts AC electric power generated by the power generator 50-1 to DC electric power and supplies the DC electric power to the storage battery 32 and/or the first control circuit 20.

The power generator 50-1 is connected to an output shaft of the GT 60-1. The power generator 50-1 is driven with operation of the GT 60-1 and generates AC electric power with the driving. The power generator 50-1 may be connected to the output shaft of the GT 60-1 via a reduction gear mechanism. The power generator 50-1 serves as a motor and causes the GT 60-1 to rotate (idle) to an operable state when supply of fuel to the GT 60-1 is stopped. At that time, the second control circuit 40-1 extracts electric power from the storage battery 32 and monitors the power generator 50-1. Instead of the aforementioned functions, a starter motor may be connected to the output shaft of the GT 60-1, and the starter motor may switch the GT 60-1 to an operable state.

The GT 60-1 is, for example, a turbo shaft engine. The GT 60-1 includes, for example, an intake port, a compressor, a combustion chamber, and a turbine which are not illustrated. The compressor compresses intake air suctioned from the intake port. The combustion chamber is disposed downstream from the compressor and combusts a gas in which the compressed air and fuel are mixed to generate combustion gas. The turbine is connected to the compressor and rotates integrally with the compressor using a force of the combustion gas. The power generator 50 connected to an output shaft of the turbine operates by allowing the output shaft of the turbine to rotate with the rotation.

The various sensors 80 include, for example, a rotation speed sensor, a plurality of temperature sensors, a plurality of pressure sensors, a lubricant sensor, an altitude sensor, and a gyro sensor. The rotation speed sensor detects a rotation speed of the turbine. The temperature sensor detects the temperature in the vicinity of the intake port of the GT 60 or the temperature in the vicinity of the downstream side of the combustion chamber. The lubricant sensor detects the temperature of a lubricant supplied to bearings or the like of the GT 60. The pressure sensor detects the pressure in a housing of the GT 60 or the pressure in the vicinity of the intake port of the GT 60. The altitude sensor detects the altitude of the flying object 1. The gyro sensor detects the posture of the airframe 10. The various sensors 80 are provided, for example, in each of the GT 60-1 and the GT 60-2. The various sensors 80 may include a sound sensor that detects sound outside of the flying object 1, sound inside thereof, or sound emitted from the GT 60.

The control device 100 includes, for example, an estimator 110, an engine controller 120, and a storage 130. The estimator 110 and the engine controller 120 are implemented, for example, by causing a hardware processor such as a central processing unit (CPU) to execute a program (software). Some or all of these functional units may be implemented by hardware (a circuit unit including circuitry) such as a large scale integration (LSI) chip, an application-specific integrated circuit (ASIC), a field-programmable gate array (FPGA), or a graphics processing unit (GPU), or may be implemented by a combination of software and hardware. The program may be stored in a storage device (a storage device including a non-transitory storage medium) such as a hard disk drive (HDD) or a flash memory of the control device 100 in advance or may be stored in a detachable storage medium (a non-transitory storage medium) such as a DVD or a CD-ROM and may be installed in the HDD or the flash memory of the control device 100 by setting the storage medium to a drive device.

The storage 130 is implemented, for example, by an HDD, a flash memory, an electrically erasable programmable read only memory (EEPROM), a read only memory (ROM), or a random access memory (RAM). For example, a first map 132 and a second map 134 (details of which will be described later) are stored in the storage 130.

The estimator 110 includes, for example, a first estimator 112 and a second estimator 114. The first estimator 112 estimates (or acquires) a magnitude of sound emitted from the GT 60-1 on the basis of detection results (an example of information for estimating noise of an engine) from one or more sensors out of the various sensors 80. The first estimator 112 estimates a magnitude of sound, for example, on the basis of a detection result from the temperature sensor, a detection result from the lubricant sensor, a detection result from the pressure sensor, or an index acquired on the basis of a calculation result of a predetermined function with them as parameters. For example, a correlation between the magnitude of sound and the detection results from the various sensors 80 is calculated in advance. The first estimator 112 estimates the magnitude of sound on the basis of the calculated correlation. For example, the first estimator 112 estimates that the magnitude of sound becomes larger as the temperature of the GT 60-1 or the temperature of the lubricant becomes higher, and estimates that the magnitude of sound becomes larger as the pressure becomes higher. For example, when each of the parameters is greater than the corresponding threshold value, the first estimator 112 may estimate that sound of equal to or greater than a reference is generated (noise excess conditions are satisfied). The first estimator 112 may estimate noise using the detection result from the rotation speed sensor (noise of the compressor or blades of the turbine and noise due to shaft vibration of the turbine) or may estimate noise due to an intake/exhaust airflow rate (an estimated value) (for example, airflow noise generated in an intake/exhaust duct). Noise estimated by the first estimator 112 is noise of some or all of the aforementioned noise. The second estimator 114 estimates (acquires) the magnitude of sound emitted from the GT 60-2 similarly to the first estimator 112.

The engine controller 120 controls the electric motors 14, the first control circuits 20, the storage battery unit 30, the second control circuits 40, the power generators 50, the GTs 60, and the like on the basis of operation states thereof, an estimation result from the estimator 110, or information acquired from the various sensors 80. For example, the control device 100 controls the aforementioned functional units such that the flying object 1 takes off or lands or the flying object 1 flies in a predetermined flight state. The engine controller 120 controls the flying object 1 on the basis of flight information. Flight information is, for example, information acquired from the detection results from the various sensors 80 or a flight state of the flying object 1 in response to a control signal. The first engine controller 122 of the engine controller 120 controls the first elements, and the second engine controller 124 of the engine controller 120 controls the second elements. The engine controller 120 controls the GTs 60 on the basis of a required electric power corresponding to the flight state of the flying object 1 and/or a state of charge of the storage battery 32 as illustrated in FIG. 3.

[Description of Flight State]

Figure 3:
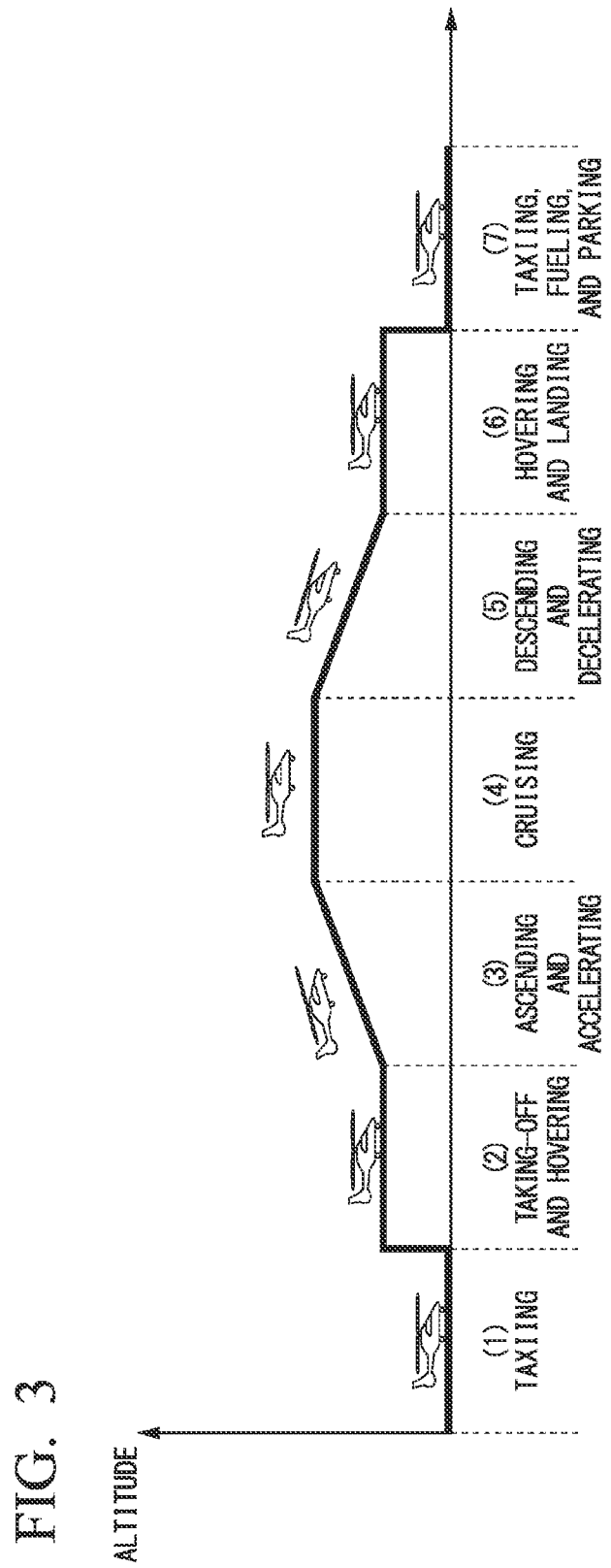
FIG. 3 is a diagram illustrating a flight state of the flying object.

FIG. 3 is a diagram illustrating the flight state of the flying object 1. As illustrated in FIG. 3, the flying object 1 performs (1) taxiing, performs (2) taking-off and hovering, performs (3) ascending and accelerating, and performs (4) cruising. Then, the flying object 1 performs (5) descending and decelerating, performs (6) hovering and landing, and performs (7) taxiing, fueling, and parking.

For example, the required electric power in the flight states in which the flying object 1 performs (2) taking-off and hovering and (6) hovering and landing out of the aforementioned flight states is likely to be greater than the required electric power in the other flight states. The required electric power in a flight state is electric power (a total of electric power which is needed to be supplied to the electric motors 14) required for the flying object 1 to transition to a flight state corresponding to a control signal or to maintain the flight state. The control device 100 supplies the required electric power to the electric motors 14 and controls the flying object 1 in the flight state corresponding to the control signal by causing the electric motors 14 to drive the rotors 12 on the basis of the required electric power.

For example, when predetermined conditions are satisfied, the engine controller 120 causes the GT 60-1 and/or the GT 60-2 to operate. The predetermined conditions include, for example, a condition that the flight state is (2) or (6) or a condition that the SOC of the storage battery becomes less than a predetermined value (or the SOC is predicted to become less than the predetermined value within a predetermined time). The predetermined conditions may be arbitrary conditions.

[Flowchart]

Figure 4:
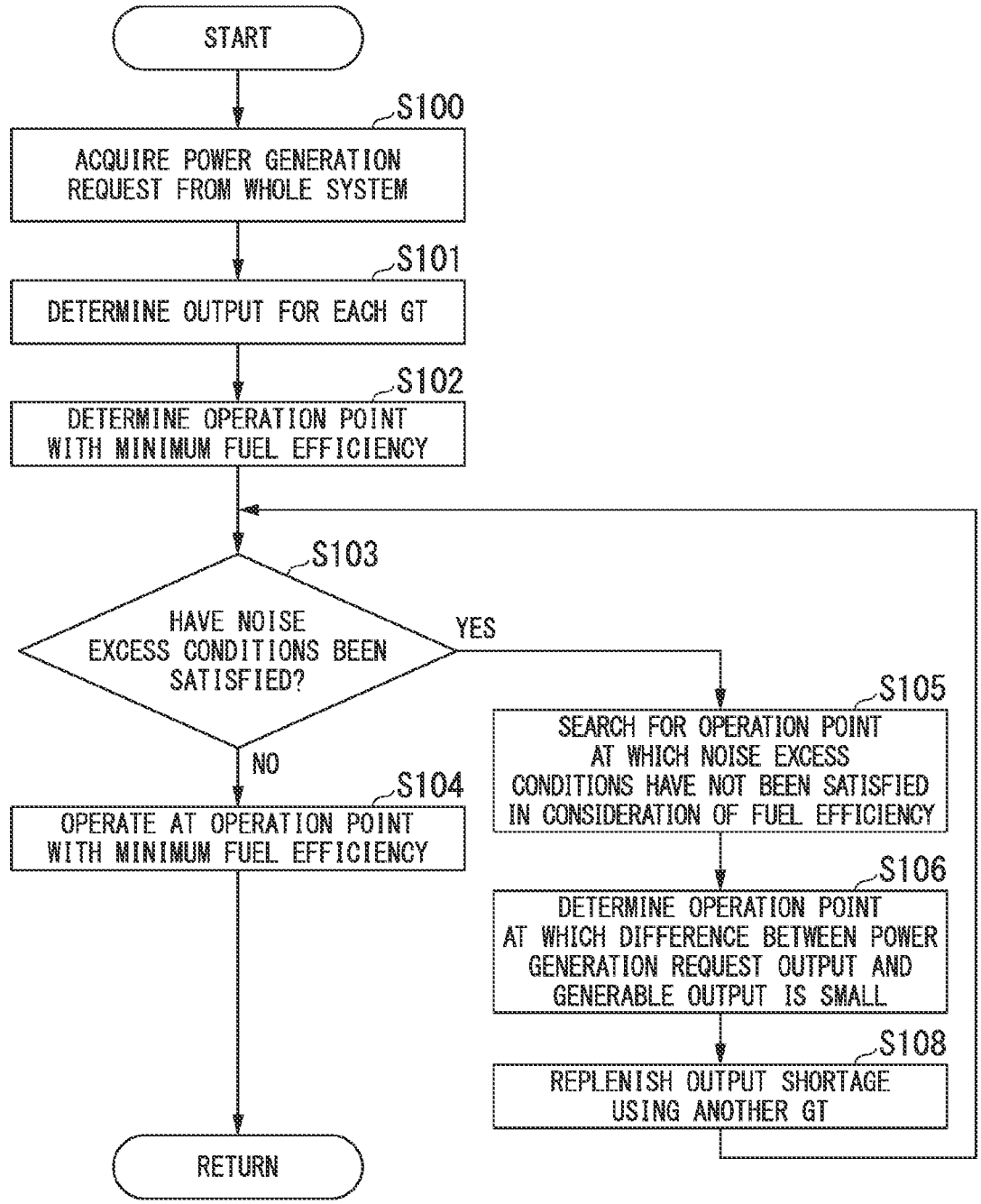
FIG. 4 is a flowchart illustrating an example of a routine which is performed by a control device.

FIG. 4 is a flowchart illustrating an example of a routine which is performed by the control device 100. This flowchart is an example, and some processes of the routine may be omitted or another process may be added to the routine. The routine of processes may be changed. As described in the flowchart, when the GT 60 satisfies noise excess conditions, the engine controller 120 changes one or both of the rotation speed of the GT 60 and the magnitude of torque in which the noise excess conditions are satisfied such that noise is lower than that before the noise excess conditions are satisfied. At this time, the fuel efficiency and the output are also considered.

First, the engine controller 120 of the control device 100 acquires a power generation request from the whole system of the flying object 1 (Step S100). The power generation request from the whole system includes an amount of electric power used for auxiliary machines included in the flying object 1 in addition to the amount of required electric power corresponding to the flight state.

Then, the engine controller 120 determines outputs of the GT 60-1 and the GT 60-2 (Step S101). For example, the engine controller 120 may determine that the GT 60-1 and the GT 60-2 operate or may determine that the GT 60 with a lower use frequency operates. The engine controller 120 may determine that the GT 60-1 and the GT 60-2 operate when the power generation request from the whole system is equal to or greater than a predetermined extent, and may determine that one of the GT 60-1 and the GT 60-2 operates when the power generation request from the whole system is less than the predetermined extent. In the following description, it is assumed that the GT 60-1 and the GT 60-2 operate.

Then, the engine controller 120 determines an operation point at which the fuel efficiency is minimized (or an operation point at which the fuel efficiency is close to a minimum value) with reference to the first map 132 (Step S102). The GTs 60 operate on the basis of the determined operation point. The first map 132 will be described later.

Then, the engine controller 120 determines whether the GT 60-1 or the GT 60-2 satisfies the noise excess conditions on the basis of the estimation result from the estimator 110 (Step S103). When the noise excess conditions are not satisfied, the engine controller 120 causes the GT 60-1 and the GT 60-2 to operate on the basis of the operation point at which the fuel efficiency is minimized.

When the noise excess conditions are satisfied (for example, when the GT 60-1 satisfies the noise excess conditions), the engine controller 120 searches for operation points at which the noise excess conditions are not satisfied in consideration of the fuel efficiency (Step S105) and determines an operation point (Step S106). This operation point is an operation point at which a difference between an output of the power generation request from the whole system (an output expected for the GT 60-1) and a generable output of the GT 60-1 which is controlled such that the noise excess conditions are not satisfied is minimized. In the process of Step S106, an operation point at which the difference is in a predetermined range may be determined instead of the operation point at which the difference is minimized.

Then, the engine controller 120 replenishes an output shortage of the GT 60-1 using the GT 60-2 (Step S108). For example, the engine controller 120 determines the operation point with reference to the first map 132 and the second map 134. Details of the processes of Steps S105 and S106 will be described later.

The processes of Steps S105 and S106 using the first map 132 and the second map 134 will be described below.

[First Map]

Figure 5:
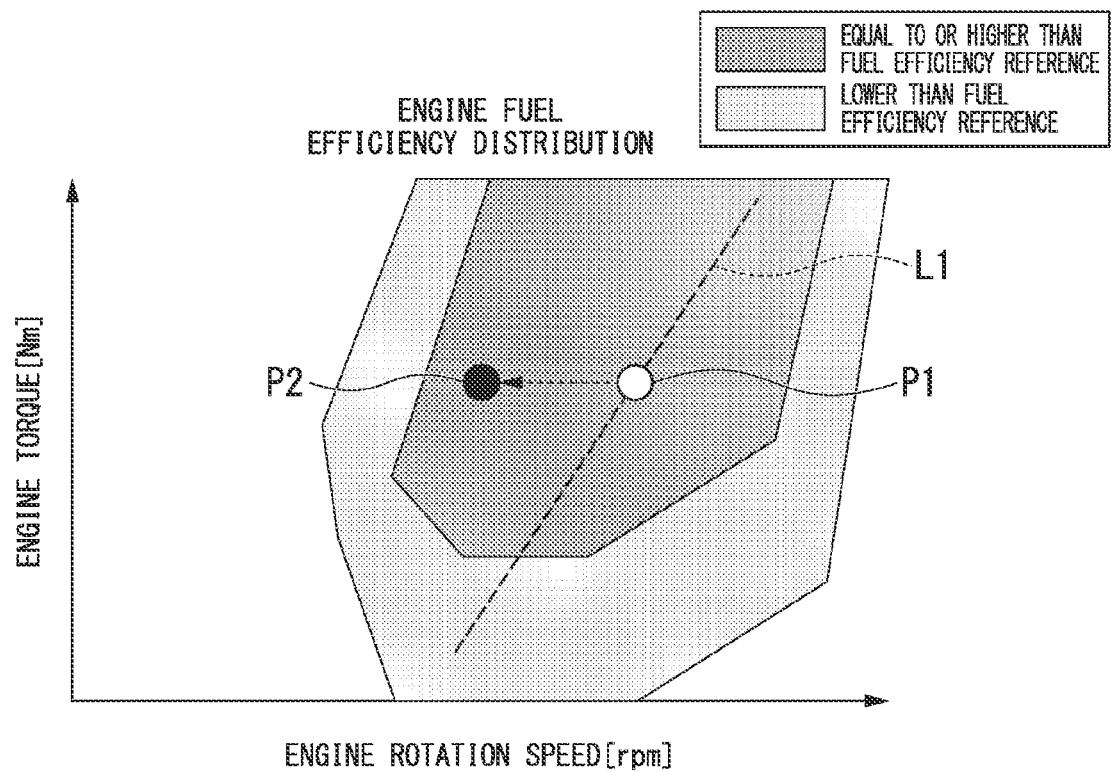
FIG. 5 is a diagram illustrating an example of a first map.

FIG. 5 is a diagram illustrating an example of the first map 132. The vertical axis in FIG. 5 represents the magnitude of an engine torque (a torque of the GT 60) [Nm], and the horizontal axis in FIG. 5 represents an engine rotation speed (a rotation speed of the GT 60) [rpm]. In the first map 132, a label indicating a first area or a label indicating a second area is correlated with each combination of the engine torque and the engine rotation speed. The first area is an area in which the fuel efficiency is equal to or lower than a fuel efficiency reference (an area with a good fuel efficiency), and the second area is an area in which the fuel efficiency is higher than the fuel efficiency reference (an area with a bad fuel efficiency). An operation line L1 is defined in the first map 132. The operation line L1 is a combination of the engine torque and the engine rotation speed in which the fuel efficiency is optimal.

[Second Map]

Figure 6:
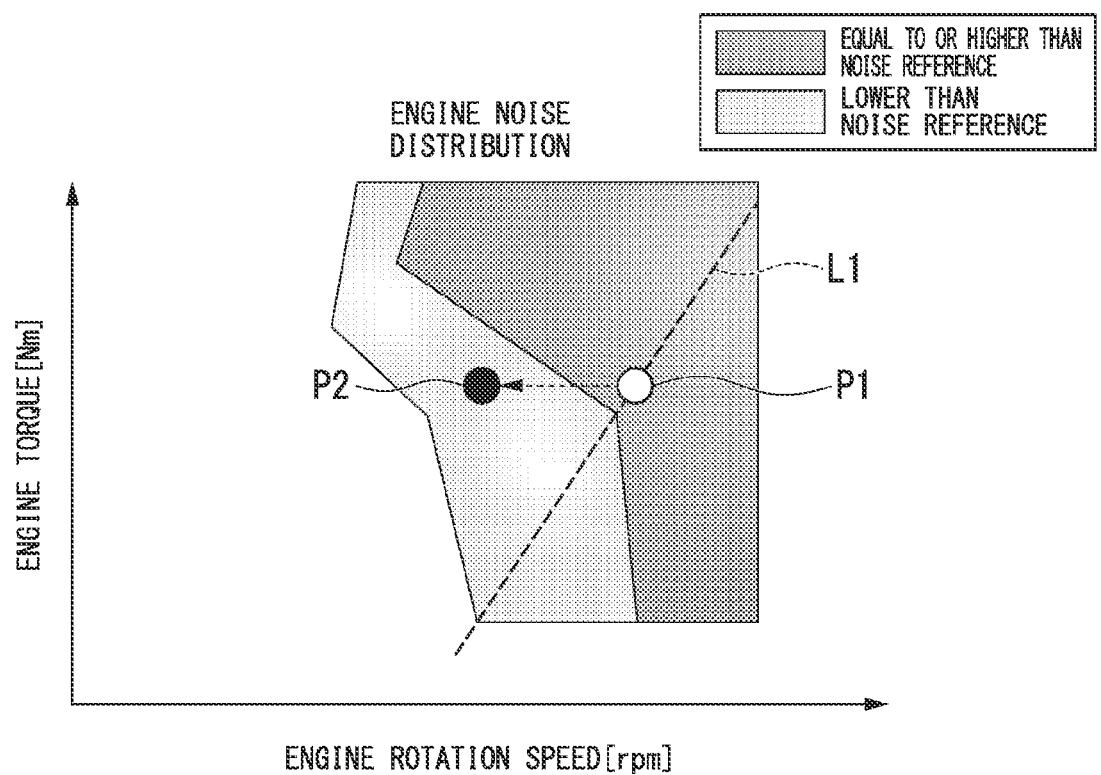
FIG. 6 is a diagram illustrating an example of a second map.

FIG. 6 is a diagram illustrating an example of the second map 134. The vertical axis in FIG. 6 represents the magnitude of an engine torque (a torque of the GT 60) [Nm], and the horizontal axis in FIG. 6 represents an engine rotation speed (a rotation speed of the GT 60) [rpm]. In the second map 134, a label indicating a third area or a label indicating a fourth area is correlated with each combination of the engine torque and the engine rotation speed. The third area is an area in which the noise is equal to or higher than a reference (an area with high noise), and the fourth area is an area in which the noise is lower than the reference (an area with low noise). For example, an operation line L1 is also defined in the second map 134.

In the following description, for example, a case in which the GT 60-1 is controlled will be described with reference to FIGS. 4 to 6. The first engine controller 122 controls the GT 60-1 such that the GT 60-1 operates in the engine torque and the engine rotation speed corresponding to an operation point P1 in which the fuel efficiency is minimized (or optimal or appropriate) (an operation point on the operation line L1) with reference to the first map 132.

For example, when the noise excess conditions are satisfied, the engine controller 120 controls one or both of the rotation speed of the engine and the magnitude of torque such that the magnitude of noise of the GT 60 is lower than a noise reference on the basis of a relationship between the rotation speed and the magnitude of torque of the GT 60 and the magnitude of noise of the GT 60 (for example, with reference to the second map 134). The engine controller 120 controls one or both of the rotation speed of the GT 60 and the magnitude of torque such that the fuel efficiency is lower than a fuel efficiency reference additionally on the basis of a relationship between the rotation speed of the GT 60 and the magnitude of torque and the fuel efficiency of the GT 60 (for example, with reference to the first map 132). The noise reference is a reference for prescribing that the magnitude of sound is equal to or lower than a threshold value, and is experimentally acquired in advance. The fuel efficiency reference is a reference indicating that the degree of deterioration of the fuel efficiency is within a range of X percentage from the fuel efficiency in control based on the operation line. "X" is, for example, a preset arbitrary value.

Specifically, when the GT 60-1 satisfies the noise excess conditions, the first engine controller 122 searches for an operation point which is included in the area in which the fuel efficiency is equal to or lower than the fuel efficiency reference and the area in which noise is lower than the noise reference with reference to the first map 132 and the second map 134. Then, the first engine controller 122 determines an operation point P2 at which a difference between the output of the power generation request and the generable output corresponding to the searched-out operation point is minimized out of the searched-out operation points. For example, the engine controller 120 calculates the generable output for each searched-out operation point and determines the operation point P2 by comparing the calculated output with the output of the power generation request.

The operation point P2 is an example of an "operation point which is a combination of the rotation speed of the engine and the magnitude of torque and at which the fuel efficiency departs from the operation line." The operation point P2 is an example of a "point at which the magnitude of noise of the engine is lower than the noise reference, the fuel efficiency is lower than the fuel efficiency reference, and the first output of the engine controlled on the basis of the operation point satisfies an output reference." The output reference is a reference indicating that the first output is within a preset range from the output of the engine controlled on the basis of the operation line. The engine controller 120 causes the GT 60-2 to replenish an output shortage when operation at the operation point P2 is performed as will be described later with reference to FIG. 8.

Figure 7:
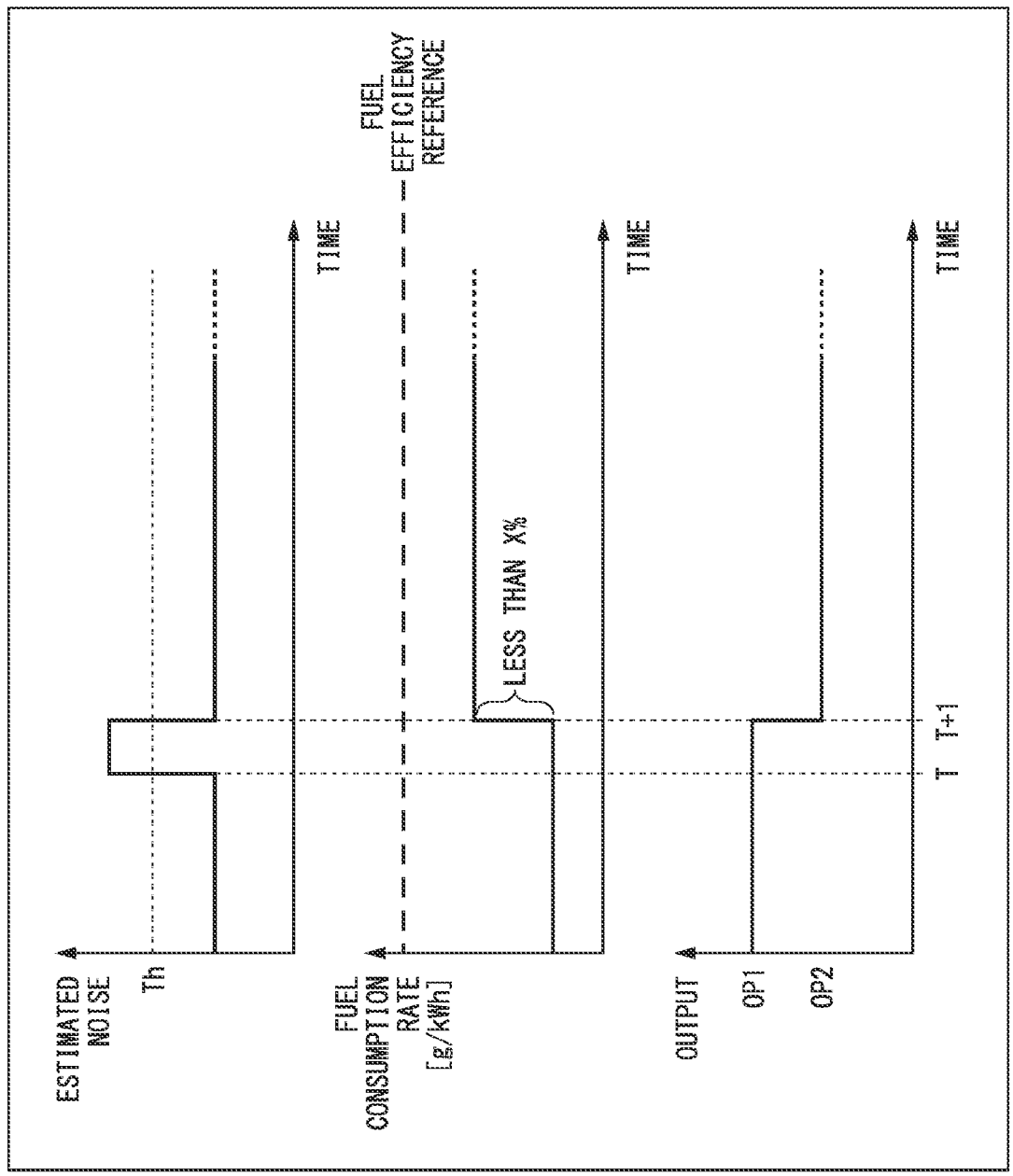
FIG. 7 is a diagram illustrating the routine illustrated in FIG. 4 or the like with the elapse of time.

FIG. 7 is a diagram illustrating the routine of processes illustrated in FIG. 4 or the like with the elapse of time. The horizontal axes in an upper part, a middle part, and a lower part of FIG. 7 represent time. The vertical axis in the upper part of FIG. 7 represents the magnitude of noise which is estimated by the estimator 110, the vertical axis in the middle part of FIG. 7 represents a fuel consumption rate [g/kWh] (fuel efficiency) of the GT 60-1, and the vertical axis in the lower part of FIG. 7 represents the output of the GT 60-1.

At time T, when the estimated noise is equal to or higher than a threshold value (when the noise excess conditions are satisfied), the GT 60-1 is controlled on the basis of the operation point P2 at which the noise excess conditions are not satisfied in consideration of the fuel efficiency. As illustrated in the middle part of FIG. 7, the fuel efficiency when the GT 60-1 operates at the operation point P2 (the post-search fuel efficiency) is the fuel efficiency within a predetermined range from the fuel efficiency when the GT 60-1 operates at the operation point P1 (a reference fuel efficiency). As illustrated in FIG. 7, a degree of deterioration of the post-search fuel efficiency from the reference fuel efficiency is less than X %. As illustrated in the middle part of FIG. 7, the post-search fuel efficiency is within a predetermined range from the fuel efficiency reference.

As illustrated in the lower part of FIG. 7, the output of the GT 60-1 decreases from an output OP1 to an output OP2. The operation point of the GT 60-1 is determined such that the decrease of the output is curbed as much as possible. In this case, the engine controller 120 increases the output of the GT 60-2 to replenish the decreased output (OP1-OP2). The decreased output is replenished by the output of the GT 60-2 (another GT).

Figure 8:
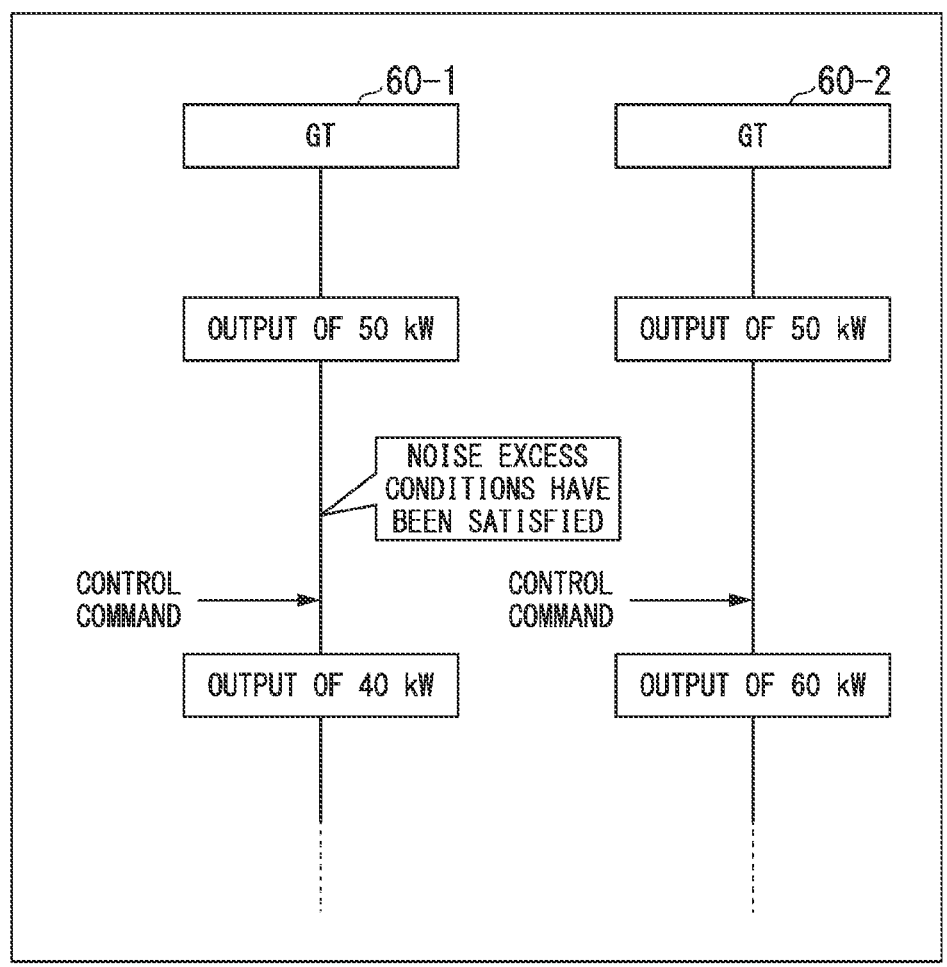
FIG. 8 is a diagram illustrating a routine of replenishing an output of a GT 60-2.

FIG. 8 is a diagram illustrating a routine of processes of replenishing an output using the GT 60-2. For example, it is assumed that the noise excess conditions of the GT 60-1 are satisfied in a state in which the GT 60-1 and the GT 60-2 output 50 [kW]. In this case, the first engine controller 122 transmits a control command for controlling the output of the GT 60-1 at 40 [kW] to the GT 60-1. The GT 60-1 decreases the output on the basis of the control command. The second engine controller 124 transmits a control command for controlling the output of the GT 60-2 at 60 [kW] to the GT 60-2. The GT 60-2 increases the output on the basis of the control command.

As described above, when the output of the GT 60-1 is decreased, the engine controller 120 replenishes the output using the GT 60-2. Accordingly, it is possible to reduce noise in consideration of the fuel efficiency and to maintain the output of the GTs 60. When the output of the GT 60-1 is increased and noise is reduced, the GT 60-2 is controlled such that the output thereof is decreased.

Reduction of noise in the GTs 60 will be described below. For example, noise of an aircraft engine that generates a thrust is considered. Noise from fans may become brittle because the rotation speeds of two right and left engines of an aircraft are different. It is conceivable to reduce such noise that engine control for keeping the rotation speeds uniform be introduced. Even when an aircraft engine generates a thrust and noise excess conditions are satisfied, it may be difficult to change the engine rotation speed and it may not be possible to change the engine operation point much.

In the flying object 1 according to this embodiment, the GTs 60 is used to generate electric power and the operation points of the GTs 60 can be flexibly changed. In the flying object 1 according to this embodiment, when noise excess conditions are satisfied, the GTs 60 are controlled at an operation point at which the fuel efficiency deteriorates less and noise is low with reference to the first map 132 and the second map 134. Accordingly, it is possible to reduce noise in consideration of the fuel efficiency. Noise in this embodiment may be sound which is felt by a person outside of the flying object 1 or may be sound which is felt by a person inside of the flying object 1.

With the aircraft control system according to the aforementioned embodiment, when it is estimated that noise excess conditions are satisfied, it is possible to more appropriately reduce noise by changing one or both of the rotation speed of the GT 60 and the magnitude of torque such that noise is lower than that before the noise excess conditions are satisfied. For example, it is expected to improve comfortability of a person near the flying object 1 or a person inside of the flying object 1.

While a mode for carrying out the present invention has been described above with reference to an embodiment, the present invention is not limited to the embodiment, and various modifications and substitutions can be performed thereon without departing from the gist of the present invention.

What is claimed is:

1. An aircraft control system comprising:
a first engine that is attached to an airframe of an aircraft;
a second engine that is attached to the airframe of the aircraft;
a first power generator that is connected to an engine shaft of the first engine;
a second power generator that is connected to an engine shaft of the second engine;
an electric motor that is driven with electric power supplied from one or both of the first power generator and the second power generator;
a rotor that is driven with a driving force output from the electric motor; and
a controller configured to:
estimate whether noise excess conditions of the first engine have been satisfied on the basis of information for estimating noise of the first engine, and
based on the noise excess conditions of the first engine being satisfied and based on a fuel efficiency reference, change one or both of a rotation speed of the first engine and a magnitude of a torque of the first engine such that noise of the first engine is lower than the noise excess conditions.

2. The aircraft control system according to claim 1, wherein the controller is configured to control one or both of the rotation speed of the first engine and the magnitude of the torque of the first engine such that a magnitude of noise of the first engine is lower than a noise reference on the basis of a relationship between the rotation speed of the first engine and the magnitude of the torque of the first engine and the magnitude of noise of the first engine when the noise excess conditions have been satisfied.

3. The aircraft control system according to claim 1, wherein the controller is configured to control one or both of the rotation speed of the first engine and the magnitude of the torque of the first engine to reduce the noise and to increase an output of another engine or the second engine to replenish a decreased output when a post-control output is lower by a predetermined extent than a pre-control output.

4. The aircraft control system according to claim 1, further comprising a storage battery that stores electric power generated by the first power generator and the second power generator,
wherein the electric motor is driven using electric power output from the storage battery.

5. An aircraft control system comprising:
a first engine that is attached to an airframe of an aircraft;
a second engine that is attached to the airframe of an aircraft;
a first power generator that is connected to an engine shaft of the first engine;
a second power generator that is connected to an engine shaft of the second engine;
an electric motor that is driven with electric power supplied from one or both of the first power generator and the second power generator;
a rotor that is driven with a driving force output from the electric motor; and
a controller configured to estimate whether noise excess conditions have been satisfied on the basis of information for estimating noise of the first engine and to change one or both of a rotation speed of the first engine and a magnitude of a torque of the first engine such that noise is lower than that before the noise excess conditions have been satisfied when it is estimated that the noise excess conditions have been satisfied,
wherein the controller is configured to control one or both of the rotation speed of the first engine and the magnitude of the torque of the first engine such that a magnitude of noise of the first engine is lower than a noise reference on the basis of a relationship between the rotation speed of the first engine and the magnitude of the torque of the first engine and the magnitude of noise of the first engine when the noise excess conditions have been satisfied, wherein the controller is configured to control one or both of the rotation speed of the first engine and the magnitude of the torque of the first engine such that a fuel efficiency of the first engine is lower than a fuel efficiency reference additionally on the basis of a relationship between the rotation speed of the first engine and the magnitude of the torque of the first engine and the fuel efficiency of the first engine.

6. The aircraft control system according to claim 5, wherein the controller is configured to control one or both of the rotation speed of the first engine and the magnitude of the torque of the first engine with reference to a first operation map indicating the fuel efficiency distribution corresponding to the rotation speed of the first engine and the magnitude of the torque of the first engine and a second operation map indicating a noise distribution corresponding to the rotation speed of the first engine and the magnitude of the torque of the first engine.

7. The aircraft control system according to claim 5, wherein the controller is configured to control the first engine along an operation line which is a combination of the rotation speed of the first engine and the magnitude of the torque of the first engine and in which the fuel efficiency is optimal and to control the first engine along the operation line when it is estimated that the noise excess conditions have not been satisfied, and wherein the controller is configured to control the first engine along the operation line and to control the first engine at an operation point which is a combination of the rotation speed of the first engine and the magnitude of the torque of the first engine and at which the fuel efficiency departs from the operation line when it is estimated that the noise excess conditions have been satisfied.

8. The aircraft control system according to claim 7, wherein the operation point is a point at which the magnitude of noise of the first engine is lower than the noise reference, the fuel efficiency is lower than the fuel efficiency reference, and a first output of the first engine controlled on the basis of the operation point satisfies an output reference, and wherein the output reference is a reference in which the first output is within a preset range from the output of the first engine controlled on the basis of the operation line.

9. An aircraft control method that is performed by a control device for an aircraft, which includes: a first engine that is attached to an airframe of the aircraft, a second engine that is attached to the airframe of the aircraft, a first power generator that is connected to an engine shaft of the first engine, a second power generator that is connected to an engine shaft of the second engine, an electric motor that is driven with electric power supplied from one or both of the first power generator and the second power generator, and a rotor that is driven with a driving force output from the electric motor, the aircraft control method comprising:

estimating whether noise excess conditions have been satisfied at the first engine on the basis of information for estimating noise of the first engine; and based on the noise excess conditions of the first engine being satisfied and based on a fuel efficiency reference, changing one or both of a rotation speed of the first engine and a magnitude of a torque of the first engine such that noise of the first engine is lower than the noise excess conditions.

10. A non-transitory computer storage medium for an aircraft, which includes, a first engine that is attached to an airframe of the aircraft, a second engine that is attached to the airframe of the aircraft, a first power generator that is connected to an engine shaft of the first engine, a second power generator that is connected to an engine shaft of the second engine, an electric motor that is driven with electric power supplied from one or both of the first power generator and the second power generator, and a rotor that is driven with a driving force output from the electric motor;

wherein the non-transitory computer storage medium stores a computer program to be executed by a computer to perform at least:

a process of estimating whether noise excess conditions have been satisfied on the basis of information for estimating noise of first engines; and a process of changing, based on the noise excess conditions of the first engine being satisfied and based on a fuel efficiency reference, one or both of a rotation speed of the first engine and a magnitude of a torque such of the first engine that noise of the first engine is lower than the noise excess conditions.

* * * * *